M. SCHEUER.
LAMINATED FABRIC.
APPLICATION FILED DEC. 29, 1915. RENEWED OCT. 1, 1918.

1,302,473.

Patented Apr. 29, 1919.

Maurice Scheuer,
Inventor:
by Robt B Killgore
Atty

Attest:

UNITED STATES PATENT OFFICE.

MAURICE SCHEUER, OF NEW YORK, N. Y.

LAMINATED FABRIC.

1,302,473.     Specification of Letters Patent.     Patented Apr. 29, 1919.

Application filed December 29, 1915, Serial No. 69,158. Renewed October 1, 1918. Serial No. 256,456.

*To all whom it may concern:*

Be it known that I, MAURICE SCHEUER, a citizen of the United States, residing in the city, county, and State of New York, have invented a new and useful Improvement in Laminated Fabrics, of which the following is a specification.

My invention relates to improvements in stretchable, laminated, leather fabrics and my objects are the production of a cheap, yet highly stretchable, material which will have the appearance of a single sheet of leather, which will be washable, in which the rubber strands will be protected from oxidation and from which a variety of articles now made of elastic webbing may be manufactured.

Figure 1:
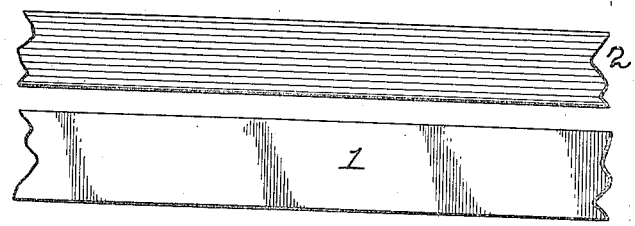
Figure 2:
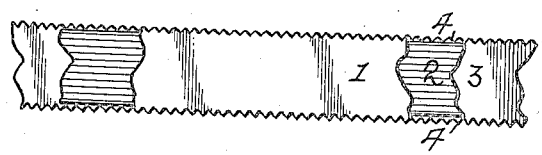
Figure 3:
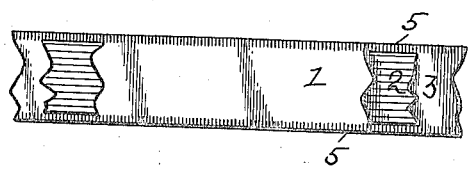
Figure 4:
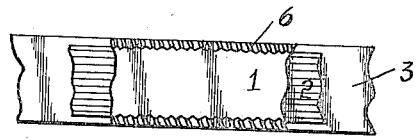

In the drawing Figure 1 is a view of the components of my laminated fabric; and Figs. 2, 3 and 4 views of the composite fabric in preferred forms.

In making my fabric a sheet of soft, stretchable leather 1, such for example as is obtained from oil tanned glove stock, is coated on one side with a suitable adhesive, such as rubber cement, while in normal condition, that is unstretched or at most slightly stretched so that it will lie flat.

A piece of ordinary elastic webbing 2 composed of textile fabric with rubber strands woven therein is also coated with a suitable adhesive such as rubber cement.

The adhesive coated leather 1 is then pressed into firm contact with the coated elastic web 2, both being preferably in their normal unstretched condition, or at most slightly stretched or elongated, the threads of the latter acting as a bond or link between the leather and the rubber strands so that the rubber strands and leather are free to elongate and contract but the leather and webbing are smoothly and uniformly united by the threads over their entire surfaces.

It is essential that the leather selected have a stretch or give in excess of the stretch or give of the webbing for the reason that if the webbing have a greater stretch or give than the leather the latter will be split, torn or broken before the web has reached its ultimate stretched length.

In the preferred form the leather is applied in two sheets, 1 and 3 to either side of the web 2 and is wider than the web, the projecting edges of the leather being cemented together to give the appearance of a single sheet of leather. This unitary appearance may be further heightened by finishing the edges by serrating, pinking, scalloping or crimping them as shown at 4 and 5 which adds to the elasticity of the resultant product, or they may be stitched as shown at 6 in Fig. 4.

As the film of rubber in the inside of the leather is waterproof and air proof the rubber strands in the web are protected from oxidation and their life is indefinitely prolonged. For the same reason the composite fabric may be freely washed with soap and water and kept clean without rotting the textile threads in the web.

By the term "normal condition" in the claims I mean unstretched or slightly stretched but not materially elongated. By "finished edge" I mean a serrated, pinked, scalloped, crimped or stitched edge.

I claim:—

1. Stretchable, laminated leather fabric composed of a sheet of smooth, uncorrugated leather cemented to a piece of elastic webbing, the leather having a greater capacity for stretching than the webbing, while the webbing is in normal condition.

2. Stretchable, laminated leather fabric composed of a sheet of smooth, uncorrugated leather cemented to a piece of elastic webbing, the leather having a greater capacity for stretching than the webbing, while the leather is in normal condition.

3. Stretchable, laminated leather fabric composed of a sheet of smooth, uncorrugated leather cemented to a piece of elastic webbing, the leather having a greater capacity for stretching than the webbing, while both are in normal condition.

4. Stretchable, laminated leather fabric composed of sheets of smooth, uncorrugated leather cemented to either side of a piece of elastic webbing, the leather having a greater capacity for stretching than the webbing, while the webbing is in a normal condition.

5. Stretchable, laminated leather fabric composed of sheets of smooth, uncorrugated leather cemented to either side of a piece of elastic webbing, the leather having a greater capacity for stretching than the webbing, while the leather is in normal condition.

6. Stretchable, laminated leather fabric composed of sheets of smooth, uncorrugated leather cemented to either side of a piece of elastic webbing, the leather having a greater capacity for stretching than the webbing, while both are in normal condition.

7. Stretchable, laminated leather fabric composed of sheets of leather secured to either side of a piece of elastic webbing, the leather having a greater capacity for stretching than the webbing, while the webbing is in normal condition, the leather layers being wider than the webbing with their projecting edges secured together.

8. Stretchable, laminated leather fabric composed of sheets of leather cemented to either side of a piece of elastic webbing, the leather having a greater capacity for stretching than the webbing, while the leather is in normal condition, the leather layers being wider than the webbing with their projecting edges secured together.

9. Stretchable, laminated leather fabric composed of sheets of leather cemented to either side of a piece of elastic webbing, the leather having a greater capacity for stretching than the webbing, while both are in normal condition, the leather layers being wider than the webbing with their projecting edges secured together.

10. Stretchable, laminated leather fabric composed of sheets of leather cemented to either side of a piece of elastic webbing, the leather having a greater capacity for stretching than the webbing, while the webbing is in normal condition, the leather layers being wider than the webbing with their projecting edges secured together.

11. Stretchable, laminated leather fabric composed of sheets of leather cemented to either side of a piece of elastic webbing, the leather having a greater capacity for stretching than the webbing, while the leather is in normal condition, the leather layers being wider than the webbing with their projecting edges secured together.

12. Stretchable, laminated leather fabric composed of sheets of leather cemented to either side of a piece of elastic webbing, the leather having a greater capacity for stretching than the webbing, while both are in normal condition, the leather layers being wider than the webbing with their projecting edges secured together.

In testimony whereof I have hereunto subscribed my name in the presence of two attesting witnesses.

MAURICE SCHEUER.

Witnesses:
  ROBERT B. KILLGORE,
  MAY M. LIPP.